United States Patent
Nonoyama et al.

(10) Patent No.: US 11,945,937 B2
(45) Date of Patent: Apr. 2, 2024

(54) METHOD FOR PRODUCING MODIFIED CONJUGATED DIENE POLYMER, MODIFIED CONJUGATED DIENE POLYMER, POLYMER COMPOSITION, CROSSLINKED BODY AND TIRE

(71) Applicant: ENEOS MATERIALS CORPORATION, Tokyo (JP)

(72) Inventors: Yoshiki Nonoyama, Minato-ku (JP); Masaaki Inoue, Minato-ku (JP)

(73) Assignee: ENEOS MATERIALS CORPORATION, Tokyo (JP)

(*) Notice: Subject to any disclaimer, the term of this patent is extended or adjusted under 35 U.S.C. 154(b) by 492 days.

(21) Appl. No.: 17/422,531

(22) PCT Filed: Feb. 28, 2020

(86) PCT No.: PCT/JP2020/008462
§ 371 (c)(1),
(2) Date: Jul. 13, 2021

(87) PCT Pub. No.: WO2020/179705
PCT Pub. Date: Sep. 10, 2020

(65) Prior Publication Data
US 2022/0073710 A1    Mar. 10, 2022

(30) Foreign Application Priority Data
Mar. 7, 2019 (JP) .................. 2019-041440

(51) Int. Cl.
C08L 15/00 (2006.01)
B60C 1/00 (2006.01)
C08C 19/22 (2006.01)
C08C 19/25 (2006.01)
C08K 3/06 (2006.01)
C08K 3/36 (2006.01)
C08L 9/06 (2006.01)

(52) U.S. Cl.
CPC ............ *C08L 15/00* (2013.01); *B60C 1/0016* (2013.01); *B60C 1/0025* (2013.01); *C08C 19/22* (2013.01); *C08C 19/25* (2013.01); *C08K 3/06* (2013.01); *C08K 3/36* (2013.01); *C08L 9/06* (2013.01)

(58) Field of Classification Search
CPC . C08L 15/00; C08L 9/06; C08C 19/22; C08C 19/25; C08K 3/36; C08K 3/06; B60C 1/00
USPC .......................................................... 524/572
See application file for complete search history.

(56) References Cited

U.S. PATENT DOCUMENTS

| | | |
|---|---|---|
| 2010/0152369 A1 | 6/2010 | Shibata et al. |
| 2018/0223008 A1* | 8/2018 | Inoue ..................... C08L 15/00 |
| 2019/0194430 A1 | 6/2019 | Morishita et al. |

FOREIGN PATENT DOCUMENTS

| | | | |
|---|---|---|---|
| JP | 11-349632 A | 12/1999 | |
| WO | WO 2008/123164 A1 | 10/2008 | |
| WO | WO-2017026288 A1 * | 2/2017 | ............... B60C 1/00 |
| WO | WO 2017/221943 A1 | 12/2017 | |

OTHER PUBLICATIONS

International Search Report dated May 19, 2020 in PCT/JP2020/008462 filed Feb. 28, 2020, 2 pages.
Extended European Search Report dated Mar. 24, 2022 in corresponding European Patent Application No. 20765609.1, 6 pages.

* cited by examiner

*Primary Examiner* — Deve V Hall
(74) *Attorney, Agent, or Firm* — Oblon, McClelland, Maier & Neustadt, L.L.P.

(57) ABSTRACT

A modified conjugated diene-based polymer is produced by a method reacting a conjugated diene-based polymer having an active terminal, which is a polymer obtained by polymerizing a monomer including a conjugated diene compound in the presence of an alkali metal compound, with a compound [A] represented by formula (1). In formula (1), each of $R^1$ and $R^2$ represents a C1 to C8 hydrocarbyl group and the like; each of $R^5$ and $R^6$ represents a C1 to C8 hydrocarbyl group and the like; each of $R^3$ and $R^4$ represents a C1 to C6 hydrocarbylene group; $R^7$ represents a C1 to C10 hydrocarbylene group; $X^1$ represents a C1 to C4 hydrocarbyloxy group; each of $X^2$ and $X^3$ represent a C1 to C4 hydrocarbyl group or hydrocarbyloxy group; m is an integer of 1 to 3.

10 Claims, No Drawings

METHOD FOR PRODUCING MODIFIED CONJUGATED DIENE POLYMER, MODIFIED CONJUGATED DIENE POLYMER, POLYMER COMPOSITION, CROSSLINKED BODY AND TIRE

CROSS-REFERENCE TO RELATED APPLICATIONS

The present application is the national stage of international application PCT/JP2020/008462, filed on Feb. 28, 2020, and claims the benefit of the filing date of Japanese Appl. No. 2019-041440, filed on Mar. 7, 2019.

TECHNICAL FIELD

The present disclosure relates to a method for producing a modified conjugated diene-based polymer, and to a modified conjugated diene-based polymer, a polymer composition, a crosslinked product, and a tire.

BACKGROUND ART

A conjugated diene-based polymer prepared through polymerization of a conjugated diene compound exhibits favorable properties (e.g., heat resistance, wear resistance, mechanical strength, and processability). Thus, the conjugated diene-based polymer has been used in various industrial products, including pneumatic tires, vibration-proof rubbers, and hoses.

As has been known, a rubber composition used for, for example, the tread or sidewall of a pneumatic tire contains a conjugated diene-based polymer, and a reinforcing agent (e.g., carbon black or silica) for improving the durability and wear resistance of a final product. Also, there has conventionally been used a modified conjugated diene-based polymer prepared through modification of a conjugated diene-based polymer with a silicon- or nitrogen-containing compound for enhancing the affinity of the conjugated diene-based polymer to a reinforcing agent (see, for example, Patent Documents 1 to 3).

PRIOR ART DOCUMENTS

Patent Documents

Patent Document 1: WO 2008/123164
Patent Document 2: JP-A-H11-349632
Patent Document 3: WO 2017/221943

SUMMARY OF THE INVENTION

Technical Problem

In view of, for example, recent environmental circumstances, increasing awareness about resource savings and energy savings, and increasing consumer needs for traveling performance, rubber materials for automobile tires have been required to achieve fuel efficiency (rolling resistance) superior to those of conventional tires. Extension of the service life (durable years) of rubber products also contributes to the reduction of environmental load, and thus demand has arisen for a material capable of producing crosslinked rubber that exhibits further increased strength and achieves improved fuel efficiency.

In view of the foregoing, an object of the present disclosure is to provide a modified conjugated diene-based polymer capable of producing a crosslinked rubber that exhibits high strength and achieves excellent fuel efficiency.

Solution to Problem

The present disclosure provides a method for producing a modified conjugated diene-based polymer, a modified conjugated diene-based polymer, a polymer composition, a crosslinked product, and a tire, which are described below.

[1] A method for producing a modified conjugated diene-based polymer, the method comprising: reacting a conjugated diene-based polymer having an active terminal, obtained by polymerizing a monomer including a conjugated diene compound in the presence of an alkali metal compound, with a compound [A] represented by formula (1):

[F1]

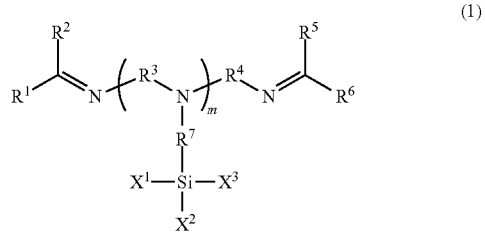

(wherein $R^1$ and $R^2$ each independently represent a hydrogen atom or a C1 to C8 hydrocarbyl group, or $R^1$ and $R^2$ taken together represent a C5 to C8 ring together with the carbon atom to which $R^1$ and $R^2$ bond; $R^5$ and $R^6$ each independently represent a hydrogen atom or a C1 to C8 hydrocarbyl group, or $R^5$ and $R^6$ taken together represent a C5 to C8 ring together with the carbon atom to which $R^5$ and $R^6$ bond; R and $R^2$ are not simultaneously a hydrogen atom, and $R^5$ and $R^6$ are not simultaneously a hydrogen atom; $R^3$ and $R^4$ each independently represent a C1 to C6 hydrocarbylene group; $R^7$ represents a C1 to C10 hydrocarbylene group; $X^1$ represents a C1 to C4 hydrocarbyloxy group; $X^2$ and $X^3$ each independently represent a C1 to C4 hydrocarbyl group or hydrocarbyloxy group; m is an integer of 1 to 3; and when m is 2 or 3, a plurality of groups $R^3$, $R^7$, $X^1$, $X^2$, or $X^3$ are identical to or different from one another).

[2] A modified conjugated diene-based polymer, which is a reaction product between a conjugated diene-based polymer having an active terminal and a compound [A] represented by the aforementioned formula (1).

[3] A polymer composition, comprising a modified conjugated diene-based polymer produced through the method as described in [1] above or the modified conjugated diene-based polymer as described in [2] above; silica; and a crosslinking agent.

[4] A crosslinked product, produced by crosslinking the polymer composition as described in [3] above.

[5] A tire comprising a tread and a sidewall, wherein at least one of the tread and the sidewall is formed from the polymer composition as described in [3] above.

Effects of the Invention

The modified conjugated diene-based polymer of the present disclosure can produce a crosslinked rubber that exhibits high strength and achieves excellent fuel efficiency.

DESCRIPTION OF EMBODIMENTS

The modified conjugated diene-based polymer of the present disclosure is a reaction product between a conjugated diene-based polymer having an active terminal and a compound [A] represented by the aforementioned formula (1). The modified conjugated diene-based polymer is produced through the below-described method including a polymerization step and a modification step. Embodiments of the present disclosure will next be described in detail.

<Polymerization Step>

This step involves polymerization of a monomer including a conjugated diene compound for preparation of a conjugated diene-based polymer having an active terminal. Examples of the conjugated diene compound used in the polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Of these, 1,3-butadiene, isoprene, and 2,3-dimethyl-1,3-butadiene are preferred.

The conjugated diene-based polymer may be a homopolymer of a conjugated diene compound. However, the conjugated diene-based polymer is preferably a copolymer of a conjugated diene compound and an aromatic vinyl compound, from the viewpoint of increasing the strength of the resultant rubber. Examples of the aromatic vinyl compound used for the polymerization include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, vinylxylene, vinylnaphthalene, vinylpyridine, diphenylethylene, and diphenylethylene containing a tertiary amino group (e.g., 1-(4-N,N-dimethylaminophenyl)-1-phenylethylene). The aromatic vinyl compound is preferably styrene and α-methylstyrene among the above-exemplified compounds.

In the case where the conjugated diene-based polymer is a copolymer of a conjugated diene compound and an aromatic vinyl compound, the conjugated diene-based polymer is preferably a polymer prepared from 1,3-butadiene and styrene serving as monomers, in view of high living property in anionic polymerization. The copolymer preferably has a random copolymerization segment in which the conjugated diene compound and the aromatic vinyl compound are irregularly distributed. The copolymer may further have a block segment formed of the conjugated diene compound or the aromatic vinyl compound.

In the case where the conjugated diene-based polymer is a copolymer of a conjugated diene compound and an aromatic vinyl compound, the amount of the aromatic vinyl compound used is preferably 3 to 55 mass %, more preferably 5 to 50 mass %, relative to the total amount of the conjugated diene compound and the aromatic vinyl compound used for the polymerization, from the viewpoint of a good balance between the low hysteresis loss property and wet skid resistance of the resultant crosslinked polymer. The amount of a structural unit derived from the aromatic vinyl compound in the polymer is measured through $^1$H-NMR. The conjugated diene compounds or aromatic vinyl compounds may be used singly or in combination of two or more species.

The polymerization may employ a monomer compound other than the conjugated diene compound and the aromatic vinyl compound (hereinafter the monomer compound may be referred to as "additional monomer"). Examples of the additional monomer include acrylonitrile, methyl (meth)acrylate, and ethyl (meth)acrylate. The amount of the additional monomer used is preferably 10 mass % or less, more preferably 5 mass % or less, relative to the total amount of the monomers used for the polymerization.

The method employed for the polymerization may be any of solution polymerization, vapor-phase polymerization, and bulk polymerization. In particular, solution polymerization is preferred. The polymerization may be performed in a batch or a continuous process. In the case where solution polymerization is performed, for example, a monomer including a conjugated diene compound is polymerized in an organic solvent in the presence of a polymerization initiator and an optional randomizer.

An alkali metal compound is used as the polymerization initiator. Specific examples of the alkali metal compound include alkyllithiums, such as methyllithium, ethyllithium, n-propyllithium, n-butyllithium, sec-butyllithium, and tert-butyllithium, 1,4-dilithiobutane, phenyllithium, stilbenelithium, naphthyllithium, 1,3-bis(1-lithio-1,3-dimethylpentyl)benzene, 1,3-phenylenebis(3-methyl-1-phenylpentylidene)dilithium, naphthylsodium, naphthylpotassium, and ethoxypotassium. Of these, lithium compounds are preferred.

The alkali metal compound used in the polymerization may be a compound having a functional group capable of interacting with silica (hereinafter the compound may be referred to as "modifying polymerization initiator"). The polymerization in the presence of such a modifying polymerization initiator can introduce a functional group capable of interacting with silica into a polymerization initiation terminal or the conjugated diene-based polymer. As used herein, the term "functional group capable of interacting with silica" refers to a group having an element capable of interacting with silica, such as nitrogen, sulfur, phosphorus, or oxygen. The term "interaction" refers to formation of a covalent bond between molecules, or formation of intermolecular force (e.g., intermolecular electromagnetic force, such as ion-dipole interaction, dipole-dipole interaction, hydrogen bond, or van der Waals force) weaker than a covalent bond.

The modifying polymerization initiator is preferably a nitrogen-containing alkali metal compound. The nitrogen-containing alkali metal compound is preferably a compound represented by formula (2):

[F2]

(2)

(wherein $R^8$ represents a nitrogen-containing group; $Y^1$ represents a hydrocarbylene group prepared through polymerization of a conjugated diene compound or an aromatic vinyl compound; $M^1$ represents an alkali metal; and n is an integer of 1 to 10).

In formula (2), the nitrogen-containing group represented by $R^8$ is preferably a monovalent group that is bonded to the group "—$(CH_2)_n$—" via a nitrogen atom and does not contain active hydrogen, and is more preferably a tertiary amino group. When R is a tertiary amino group, R is, for example, a group "—NR$^{11}$R$^{12}$" (wherein R$^{11}$ and R$^{12}$ each independently represent a C1 to C10 hydrocarbyl group).

In the hydrocarbylene group represented by Y$^1$, the conjugated diene compound or aromatic vinyl compound may be a compound selected from among the above-exemplified monomer compounds used for the polymerization. Of these, Y$^1$ is preferably a hydrocarbylene group prepared through polymerization of 1,3-butadiene, isoprene, 2,3-dimethyl-1,3-butadiene, or styrene, particularly preferably a hydrocarbylene group prepared through polymerization of isoprene. The polymerization degree of Y$^1$ is preferably 2 to 10, more preferably 2 to 4. Examples of the alkali metal represented by M$^1$ include lithium, sodium, and potassium. Lithium is preferred.

The compound represented by the aforementioned formula (2) is preferably ((2E,6E)-11-(dimethylamino)-3,7-dimethylundeca-2,6-dien-1-yl)lithium.

The modifying polymerization initiator used for the polymerization is, for example, a mixture of a nitrogen-free alkali metal compound and a secondary amine compound, besides a compound represented by the aforementioned formula (2). Examples of the secondary amine compound of the mixture include chain or cyclic secondary amine compounds, such as dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane, N-trimethylsilylpiperazine, 1,3,3-trimethyl-6-azabicyclo[3.2.1]octane, and 1-propyl-3-azabicyclo[3.2.2]nonane. The nitrogen-free alkali metal compound is preferably alkyllithium.

In the case where the polymerization is performed in the presence of the aforementioned mixture, a nitrogen-free alkali metal compound and a secondary amine compound may be mixed in advance, and the resultant mixture may be added to the polymerization system for polymerization. Alternatively, a nitrogen-free alkali metal compound and a secondary amine compound may be added to the polymerization system, and these compounds may be mixed in the polymerization system for polymerization.

The amount of the polymerization initiator used (or the total amount of two or more polymerization initiators used) is preferably 0.01 to 20 mmol, more preferably 0.05 to 15 mmol, relative to 100 g of the monomer used for synthesis of the modified conjugated diene-based polymer. The amount of the compound represented by the aforementioned formula (2) is preferably 50 mol % or more, more preferably 60 mol % or more, still more preferably 80 mol % or more, relative to the total amount of the polymerization initiator(s) (preferably alkali metal compound(s)) used for polymerization of the monomer.

The randomizer can be used for the purpose of, for example, adjustment of the vinyl bond content (i.e., the amount of vinyl bonds) of the polymer. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. These randomizers may be used singly or in combination of two or more species.

The organic solvent used for polymerization may be any organic solvent that is inert to the reaction. Examples of the organic solvent include aliphatic hydrocarbons, alicyclic hydrocarbons, and aromatic hydrocarbons. In particular, the organic solvent is preferably a C3 to C8 hydrocarbon. Specific examples of the C3 to C8 hydrocarbon include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, and cyclohexene. These organic solvents may be used singly or in combination of two or more species.

In the case of the solution polymerization, the monomer concentration of the reaction solvent is preferably 5 to 50 mass %, more preferably 10 to 30 mass %, from the viewpoint of maintaining the balance between productivity and polymerization controllability. The polymerization reaction temperature is preferably −20° C. to 150° C., more preferably 0 to 120° C. The polymerization reaction is preferably performed under a pressure sufficient to maintain the monomer substantially in a liquid phase. Such a pressure can be achieved by, for example, pressurizing the reactor by use of a gas employed inert to the polymerization reaction.

The polymerization reaction can produce a conjugated diene-based polymer having an active terminal. The resultant conjugated diene-based polymer has a weight average molecular weight (Mw) (in terms of polystyrene) of preferably $5.0 \times 10^4$ to $1.0 \times 10^6$ as measured by means of gel permeation chromatography (GPC). An Mw of less than $5.0 \times 10^4$ may lead to a reduction in the tensile strength, low exothermicity, and wear resistance of the resultant cross-linked polymer, whereas an Mw exceeding $1.0 \times 10^6$ may lead to poor processability of a rubber composition containing the modified polymer. The Mw is more preferably $8.0 \times 10^4$ to $8.0 \times 10^5$, still more preferably $1.0 \times 10^5$ to $5.0 \times 10^5$.

In the conjugated diene-based polymer having an active terminal, the vinyl bond content (hereinafter may be referred to as "vinyl content") of a butadiene unit is preferably 30 mass % or more, more preferably 33 mass % or more, still more preferably 35 mass % or more. The vinyl content is preferably 70 mass % or less, more preferably 68 mass % or less, still more preferably 65 mass % or less. A vinyl content of less than 30 mol % may lead to poor grip property, whereas a vinyl content exceeding 70 mass % may lead to a reduction in the wear resistance of the resultant vulcanized rubber. As used herein, the term "vinyl content" refers to the percentage of the structural unit having a 1,2-bond relative to all the butadiene structural units in the conjugated diene-based polymer. The vinyl content is measured by means of $^1$H-NMR.

<Modification Step>

This step involves reaction between an active terminal of the conjugated diene-based polymer prepared through the aforementioned polymerization step and a compound [A] represented by formula (1). Use of the compound [A] as a terminal modifier can produce a modified conjugated diene-based polymer having two or more branched chains and modified with a group capable of interacting with silica.

[F3]

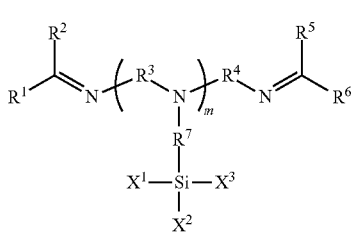
(1)

(In formula (1), $R^1$ and $R^2$ each independently represent a hydrogen atom or a C1 to C8 hydrocarbyl group, or $R^1$ and $R^2$ taken together represent a C5 to C8 ring together with the carbon atom to which $R^1$ and $R^2$ bond; $R^5$ and $R^6$ each independently represent a hydrogen atom or a C1 to C8 hydrocarbyl group, or $R^5$ and $R^6$ taken together represent a C5 to C8 ring together with the carbon atom to which $R^5$ and $R^6$ bond; $R^1$ and $R^2$ are not simultaneously a hydrogen atom, and $R^5$ and $R^6$ are not simultaneously a hydrogen atom; $R^3$ and $R^4$ each independently represent a C1 to C6 hydrocarbylene group; $R^7$ represents a C1 to C10 hydrocarbylene group; $X^1$ represents a C1 to C4 hydrocarbyloxy group; $X^2$ and $X^3$ each independently represent a C1 to C4 hydrocarbyl group or hydrocarbyloxy group; m is an integer of 1 to 3; and when m is 2 or 3, a plurality of groups $R^3$, $R^7$, $X^1$, $X^2$, or $X^3$ are identical to or different from one another).

In formula (1), the C1 to C8 hydrocarbyl group represented by each of $R^1$, $R^2$, $R^5$, and $R^6$ is, for example, a C1 to C8 alkyl group, a C3 to C8 cycloalkyl group, a C2 to C8 alkenyl group, or a C6 to C8 aryl group. The ring represented by $R^1$ and $R^2$ taken together with the carbon atom to which $R^1$ and $R^2$ bond, or the ring represented by $R^5$ and $R^6$ taken together with the carbon atom to which $R^5$ and $R^6$ bond is, for example, a cyclopentane ring, a cyclohexane ring, a cycloheptane ring, or a cyclooctane ring. Each of $R^1$, $R^2$, RE, and $R^6$ is preferably a C1 to C8 hydrocarbyl group, more preferably a C1 to C8 linear or branched alkyl group.

Each of $R^3$ and $R^4$ includes a C1 to C6 alkanediyl group, a C3 to C6 cycloalkylene group, a C2 to C6 alkenediyl group, and a phenylene group. Each of $R^3$ and $R^4$ is preferably a C1 to C6 alkanediyl group, more preferably a C2 to C6 alkanediyl group, still more preferably a C2 to C4 linear alkanediyl group.

$R^7$ includes a C1 to C10 alkanediyl group, a C3 to C10 cycloalkylene group, a C2 to C10 alkenediyl group, and a C6 to C10 arylene group. Of these, $R^7$ is preferably a C1 to C10 linear or branched alkanediyl group.

Examples of the C1 to C4 hydrocarbyloxy group represented by each of $X^1$ to $X^3$ include a methoxy group, an ethoxy group, a propoxy group, an isopropoxy group, and a butoxy group. Examples of the C1 to C4 hydrocarbyl group represented by each of $X^2$ and $X^3$ include a methyl group, an ethyl group, a propyl group, an isopropyl group, and a butyl group. From the viewpoint of improving the fuel efficiency of the resultant crosslinked rubber, preferably, at least one of $X^2$ and $X^3$ is a hydrocarbyloxy group, more preferably, both $X^2$ and $X^3$ are a hydrocarbyloxy group.

m is preferably 1 or 2, more preferably 1, from the viewpoint of preventing impairment of the processability of a rubber composition containing the modified conjugated diene-based polymer of the present disclosure.

Specific examples of the compound [A] include compounds represented by the following formulae (1-1) to (1-15). The compounds [A] may be used singly or in combination of two or more species.

[F4]

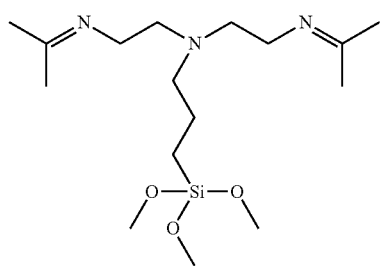
(1-1)

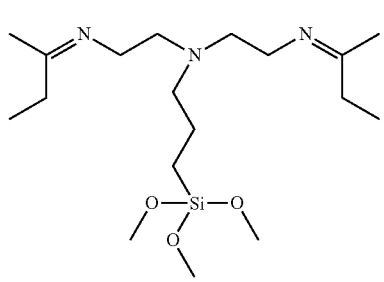
(1-2)

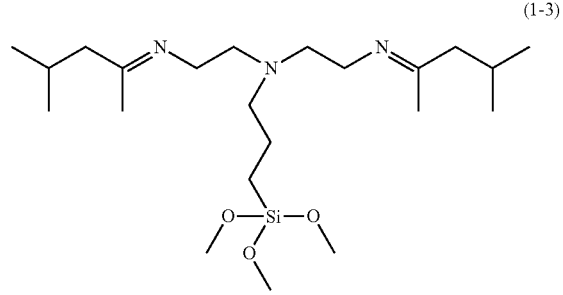
(1-3)

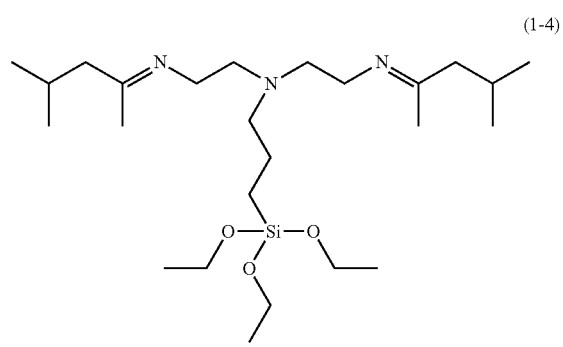
(1-4)

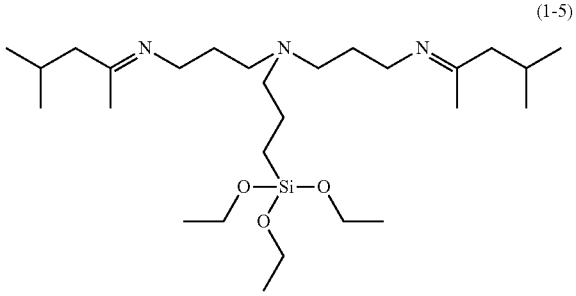
(1-5)

-continued (1-6)
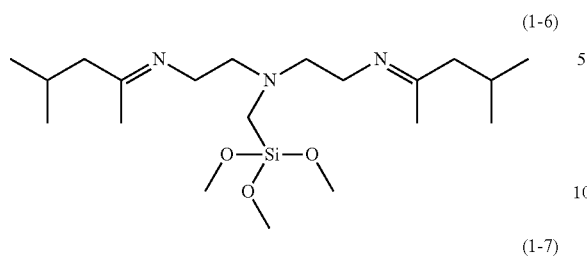

(1-7)
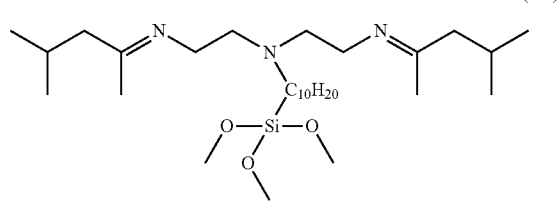

(1-8)
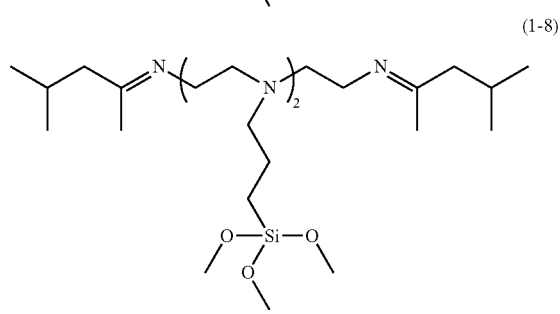

(1-9)
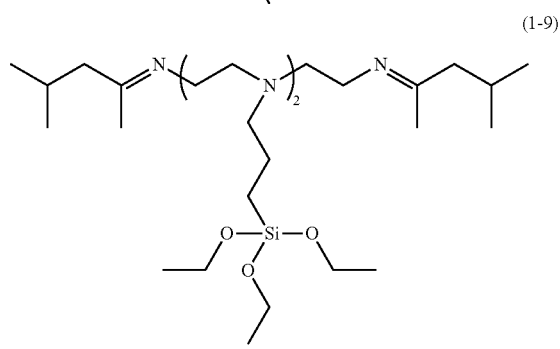

(1-10)
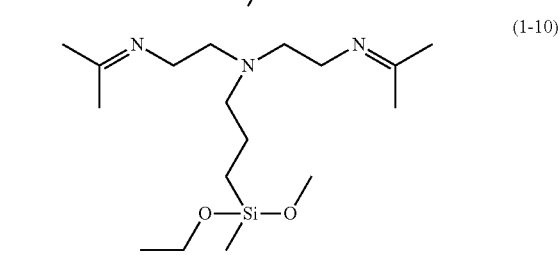

(1-11)
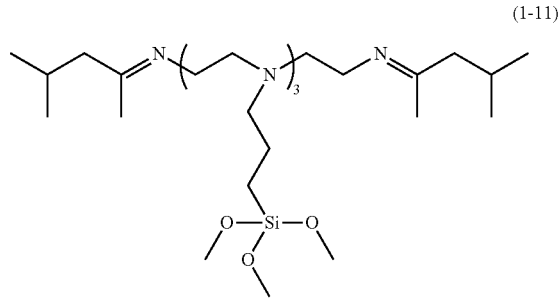

-continued (1-12)
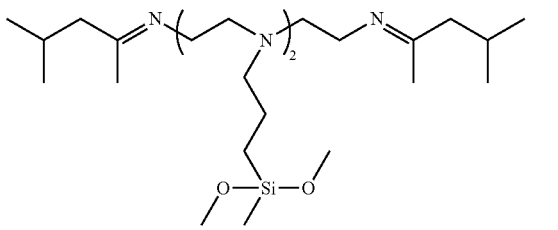

(1-13)
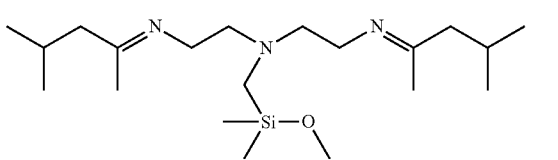

(1-14)
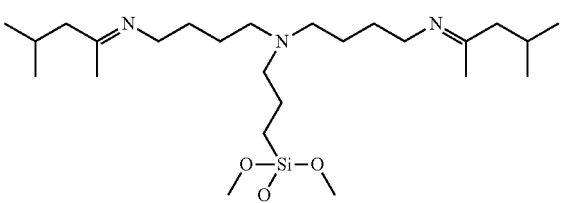

(1-15)
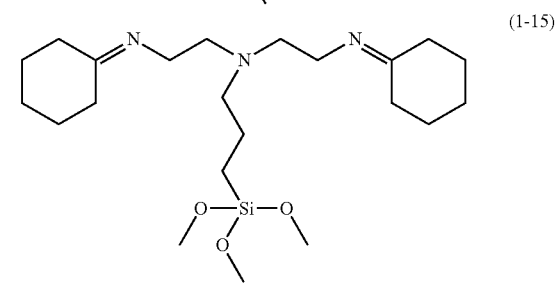

The compound [A] can be synthesized through an appropriate combination of organic chemical techniques. Specifically, a compound represented by the aforementioned formula (1) is produced as follows: a compound represented by "$H_2N-(R^3-NH)_m-R^4-NH_2$" is reacted with a compound represented by "$R^1-C(=O)-R^2$" and a compound represented by "$R^5-C(=O)-R^6$", to thereby prepare a compound represented by "$(R^1)(R^2)C=N-(R^3-NH)_m-R^4-N=C(R^5)(R^6)$"; and the resultant compound is reacted with a compound represented by "$Y^2-R^7-Si(X^1)(X^2)(X^3)$" (wherein $Y^2$ represents a halogen atom). This synthesis reaction can be performed optionally in an appropriate organic solvent in the presence of a catalyst. However, the synthesis method for the compound [A] is not limited to the aforementioned method.

The reaction between the conjugated diene-based polymer having an active terminal and the compound [A] is preferably a solution reaction. The amount of the compound [A] used (or the total amount of two or more compounds [A] used) is preferably 0.01 mol or more, more preferably 0.05 mol or more, relative to 1 mol of the metal atom (responsible for the polymerization) of the polymerization initiator, from the viewpoint of sufficient proceeding of the modification reaction. In order to prevent excessive addition, the amount of the compound [A] used is preferably less than 2.0 mol, more preferably less than 1.5 mol, relative to 1 mol of the metal atom (responsible for the polymerization) of the polymerization initiator.

The modification reaction temperature is generally equal to the polymerization reaction temperature, and is preferably −20° C. to 150° C., more preferably 0 to 120° C. An excessively low reaction temperature tends to lead to an increase in the viscosity of the modified polymer, whereas an excessively high reaction temperature promotes the inactivation of the polymerization active terminal. The reaction time is preferably 1 minute to 5 hours, more preferably 2 minutes to 1 hour.

When the conjugated diene-based polymer having an active terminal is reacted with the compound [A], a compound different from the compound [A] (hereinafter the different compound may be referred to as "additional modifier or coupling agent") may be used in addition to the compound [A] No particular limitation is imposed on the additional modifier or coupling agent, so long as it is a compound capable of reacting with the active terminal of the conjugated diene-based polymer produced through the aforementioned polymerization. The modifier or coupling agent used for the conjugated diene-based polymer may be any known compound (e.g., a nitrogen-containing alkoxysilane compound or a glycidyl-group-containing polysiloxane). When such an additional modifier or coupling agent is used, the amount thereof is preferably 5 mol % or less, more preferably 1 mol % or less.

The modified conjugated diene-based polymer can be isolated from the reaction mixture through a known solvent removal method (e.g., steam stripping) or a drying operation such as thermal treatment. The modified conjugated diene-based polymer of the present disclosure has a weight average molecular weight (in terms of polystyrene) as measured by means of gel permeation chromatography (GPC) of preferably $1.5 \times 10^5$ to $2.0 \times 10^6$, more preferably $1.8 \times 10^5$ to $1.5 \times 10^6$, still more preferably $2.0 \times 10^5$ to $1.2 \times 10^6$, from the viewpoint of producing crosslinked rubber exhibiting high strength, low exothermicity, and excellent wear resistance. The weight average molecular weight of the modified conjugated diene-based polymer is determined from the maximum peak molecular weight of a GPC curve as measured by means of GPC after the reaction between the conjugated diene-based polymer having an active terminal and the compound [A].

In a GPC curve obtained by means of GPC after the reaction between the conjugated diene-based polymer having an active terminal and the compound [A], the ratio of the area AT of a peak showing a peak top molecular weight twice or more that of a peak of minimum molecular weight to the total area AL of the peaks of the GPC curve; i.e., the AT/AL ratio (hereinafter may be referred to as "coupling ratio of two or more branches") is preferably 40% or more. When the AT/AL ratio is 40% or more, crosslinked rubber exhibiting sufficiently high strength and achieving better fuel efficiency can be preferably produced. From such a viewpoint, the coupling ratio of two or more branches is more preferably 45% or more, still more preferably 50% or more, particularly preferably 60% or more. The coupling ratio of two or more branches is, for example, 99% or less, preferably 90% or less.

The peak top molecular weight of a peak of minimum molecular weight, which is measured by means of GPC after the reaction between the conjugated diene-based polymer having an active terminal and the compound [A], is preferably $5.0 \times 10^4$ to $2.0 \times 10^6$, more preferably $8.0 \times 10^4$ to $1.5 \times 10^6$, still more preferably $1.0 \times 10^6$ to $1.2 \times 10^6$.

The modified conjugated diene-based polymer produced through the aforementioned step has a branched structure wherein a modified or unmodified conjugated diene-based polymer chain is bonded to a plurality of reactive sites of the compound [A] (i.e., a carbon-nitrogen double bond (C=N group) and a hydrocarbyloxysilyl group). The compound [A] has at least three hydrocarbylene groups bonded to a nitrogen atom, wherein two C=N groups and at least one hydrocarbyloxysilyl group are bonded to different hydrocarbylene groups. Conceivably, when the compound [A] is used as a modifier, the reaction between the conjugated diene-based polymer having an active terminal and a C=N group preferentially occurs, leading to an increase in the number of branches of the conjugated diene-based polymer chain, as well as an increase in the number of remaining hydrocarbyloxysilyl groups. This probably contributes to improved interaction between the modified conjugated diene-based polymer and silica, resulting in excellent low exothermicity of the crosslinked product produced from the modified conjugated diene-based polymer.

The production method including the aforementioned polymerization step and modification step produces a modified conjugated diene-based polymer represented by formula (3):

[F7]

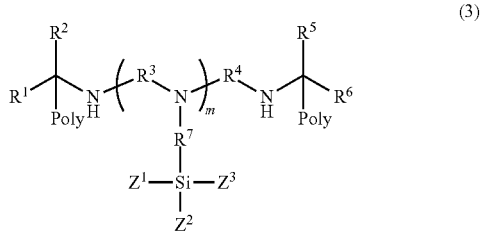

(3)

(wherein $R^1$ and $R^2$ each independently represent a hydrogen atom or a C1 to C8 hydrocarbyl group, or $R^1$ and $R^2$ taken together represent a C5 to C8 ring together with the carbon atom to which $R^1$ and $R^2$ bond; $R^5$ and $R^6$ each independently represent a hydrogen atom or a C1 to C8 hydrocarbyl group, or $R^5$ and $R^6$ taken together represent a C5 to C8 ring together with the carbon atom to which $R^5$ and $R^6$ bond; $R^1$ and $R^2$ are not simultaneously a hydrogen atom, and $R^5$ and $R^6$ are not simultaneously a hydrogen atom; $R^3$ and $R^4$ each independently represent a C1 to C6 hydrocarbylene group; $R^7$ represents a C1 to C10 hydrocarbylene group; Poly represents a modified or unmodified conjugated diene-based polymer chain; $Z^1$ represents a C1 to C4 hydrocarbyloxy group or a modified or unmodified conjugated diene-based polymer chain; $Z^2$ and $Z^3$ each independently represent a C1 to C4 hydrocarbyl group, a C1 to C4 hydrocarbyloxy group, or a modified or unmodified conjugated diene-based polymer chain; m is an integer of 1 to 3; and when m is 2 or 3, a plurality of groups R, $R^7$, $Z^1$, $Z^2$ or $Z^3$ are identical to or different from one another).

In formula (3), $R^1$ to $R^7$ and m are as described in the aforementioned formula (1). The hydrocarbyloxy group represented by each of $Z^1$ to $Z^3$ is as described about $X^1$ to $X^3$ in the aforementioned formula (1). When each of $Z^1$ to $Z^3$ is a hydrocarbyloxy group, it is preferably an ethoxy group or a methoxy group. The conjugated diene-based polymer chain represented by each of $Z^1$ to $Z^3$ or the conjugated diene-based polymer chain (Poly) in formula (3) is a structure corresponding to the conjugated diene-based polymer having an active terminal produced through the aforementioned polymerization step. The conjugated diene-based polymer chain may have a functional group capable of interacting with silica at the end of the polymer chain. The functional group at the end of the conjugated diene-based polymer chain is preferably a nitrogen-containing group in view of its high effect of improving the fuel efficiency of the resultant crosslinked rubber.

<Polymer Composition>

The polymer composition of the present disclosure contains the aforementioned modified conjugated diene-based polymer, silica, and a crosslinking agent. The amount of the modified conjugated diene-based polymer contained in the polymer composition is preferably 10 mass % or more, more preferably 20 mass % or more, still more preferably 25 mass % or more, relative to the entire amount of the polymer composition. The amount of the modified conjugated diene-based polymer contained in the polymer composition is preferably 50 mass % or less, more preferably 40 mass % or less.

Examples of the silica include wet silica (hydrated silica), dry silica (silicic anhydride), colloidal silica, precipitated silica, calcium silicate, and aluminum silicate. Of these, wet silica is particularly preferred from the viewpoints of an improvement in fracture resistance, and the compatibility between wet grip property and low rolling resistance. Also, use of high dispersible-type silica is preferred for achieving favorable dispersion of the silica in the polymer composition and improvements in physical properties and processability. These silica materials may be used singly or in combination of two or more species.

The polymer composition may contain, in addition to silica, any reinforcing filler (e.g., carbon black, clay, or calcium carbonate). Preferably, silica is used alone, or carbon black and silica are used in combination. The total amount of silica and carbon black contained in the polymer composition is preferably 20 to 130 parts by mass, more preferably 25 to 110 parts by mass, relative to 100 parts by mass of the total amount of the polymer components contained in the polymer composition.

Examples of the crosslinking agent include sulfur, sulfur halides, organic peroxides, quinone dioximes, organic polyamine compounds, and alkyl phenolic resins having a methylol group. Sulfur is generally used. The amount of sulfur is preferably 0.1 to 5 parts by mass, more preferably 0.5 to 3 parts by mass, relative to 100 parts by mass of the total amount of the polymer components contained in the polymer composition.

The polymer composition of the present disclosure, which contains the above-prepared modified conjugated diene-based polymer, may contain an additional rubber component. Examples of the type of the additional rubber component include, but are not particularly limited to, butadiene rubber (BR, such as high cis BR having a cis-1,4 bond content of 90% or more, or BR containing syndiotactic-1, 2-polybutadiene (SPB)), styrene butadiene rubber (SBR), natural rubber (NR), isoprene rubber (IR), styrene-isoprene copolymer rubber, and butadiene-isoprene copolymer rubber. BR or SBR is more preferred. The amount of the additional rubber component contained in the polymer composition is preferably 60 mass % or less, more preferably 50 mass % or less, relative to the total amount of the modified conjugated diene-based polymer and the additional rubber component.

The polymer composition may contain, as an extender oil, a process oil commonly used for oil extension of an elastomer. The process oil is incorporated into the rubber composition through, for example, direct addition of the oil during incorporation of a rubber component. Examples of preferred process oils include various oils known in the art. Examples of the process oils include aromatic oils, paraffinic oils, naphthenic oils, vegetable oils, and oils having a low polycyclic aromatic compound content (low PCA oils), such as mild extraction solvate (MES), treated distillate aromatic extract (TDAE), special residual aromatic extract (SRAE), and heavy naphthenic oil. Examples of commercially available MES include Catenex SNR (heavy paraffin prepared through dewaxing of distillate oil with a solvent) (manufactured by Shell). Examples of commercially available TDAE include Vivatec 500 (manufactured by H&R Wasag AG). Examples of commercially available SRAE include NC140 (manufactured by Japan Energy Corp.). The amount of the process oil incorporated is preferably 10 to 100 parts by mass relative to 100 parts by mass of the total amount of the polymer components contained in the polymer composition.

The polymer composition may contain, in addition to the aforementioned components, any additive that is commonly used in a rubber composition for tire. Examples of the additive include an antioxidant, zinc flower, stearic acid, a softener, sulfur, a vulcanization accelerator, a silane coupling agent, a compatibilizer, a vulcanization aid, a processing aid, and an anti-scorching agent. The amount of such an additive incorporated into the polymer composition may be appropriately determined, so long as the advantageous effects of the present disclosure are not impaired.

The polymer composition of the present disclosure can be prepared through kneading of the polymer components, silica, the crosslinking agent, and an optional component by means of, for example, an open-type kneader (e.g., a roll) or a closed-type kneader (e.g., a Banbury mixer). The polymer composition is prepared into a crosslinked product through molding and subsequent crosslinking (vulcanization). The resultant crosslinked product can be applied to various rubber products. For example, the crosslinked product may be applied to tires (e.g., tire tread, undertread, carcass, sidewall, and bead); sealing materials, such as packing, gasket, weather strip, and O-ring; interior and exterior surface materials for various vehicles, such as automobile, ship, aircraft, and train; building materials; vibration-proof rubbers for industrial machines, facilities, etc.; hoses and hose covers, such as diaphragm, roll, radiator hose, and air hose; belts, such as belts for power transmission; linings; dust boots; materials for medical devices; fenders; insulating materials for electric wires; and other industrial products.

The modified conjugated diene-based polymer of the present disclosure can produce a crosslinked product achieving favorable physical properties (e.g., fuel efficiency and strength) required for tire application. Thus, the polymer composition containing the modified conjugated diene-based polymer of the present disclosure is particularly suitable for use as a material for a tire tread or sidewall or both.

The tire may be produced by a customary method. For example, the polymer composition is mixed by means of a kneader to form a sheet, and the sheet is disposed at a predetermined position (e.g., the outside of a carcass in the case of a sidewall) and vulcanized through a customary method, to thereby form a tread rubber or a sidewall rubber. Then, a pneumatic tire is thereby produced.

EXAMPLES

The present disclosure will next be described in detail by way of examples, which should not be construed as limiting the disclosure thereto. Unless otherwise specified, the units "part(s)" and "%" described in Examples and Comparative Examples refer to "part(s) by mass" and "mass %," respectively. The physical properties of a polymer and rubber are determined as described below.

[Evaluation of Properties of Polymer and Rubber]

Vinyl content (%): determined by means of $^1$H-NMR (400 MHz).

Bonded styrene content (%): determined by means of $^1$H-NMR (400 MHz).

Weight average molecular weight (Mw): determined on the basis of a chart of molecular weight (in terms of polystyrene) obtained by means of gel permeation chromatography (GPC). Specific conditions for GPC are as follows.

(GPC Conditions)
  Chromatograph: HLC-8020 (manufactured by Tosoh Corporation)
  Column: two columns of GMH-HR-H (manufactured by Tosoh Corporation) connected in series
  Detector: differential refractometer RI-8020 (manufactured by Tosoh Corporation)
  Eluent: tetrahydrofuran
  Column temperature: 40° C.
  Flow rate: 1.0 mL/min
  Sample concentration: 10 mg/20 mL
  Mooney viscosity ($ML_{1+4}$, 100° C.): determined according to JIS K6300-1:2013 by use of an L rotor under the following conditions: preheating: 1 minute, rotor operation time: 4 minutes, temperature: 100° C.

Coupling ratio of two or more branches (%): the coupling ratio of two or more branches was determined as the ratio of the area of a peak showing a peak top molecular weight twice or more that of a peak of minimum molecular weight to the polymer-derived total area (100%) of a GPC curve.

Synthesis of (Modified) Conjugated Diene-Based Polymer

Example 1: Synthesis and Physical Properties of Modified Conjugated Diene-Based Polymer i Cyclohexane (1,600 g), 2,2-di(tetrahydrofuryl)propane (1.96 mmol), styrene (108 g), and 1,3-butadiene (272 g) were added to an autoclave reactor (inner volume: 5 L) purged with nitrogen. The temperature of the mixture contained in the reactor was adjusted to 10° C., and then n-butyllithium (3.87 mmol) serving as a polymerization initiator was added to the reactor for initiation of polymerization. The polymerization was performed under adiabatic conditions, and the maximum temperature reached 85° C. When the polymerization conversion reached 99% (after the elapse of 20 minutes from initiation of the polymerization), 1,3-butadiene (20 g) was added to the reactor over 10 minutes. Thereafter, N,N-bis(2-(((E)-4-methylpentan-2-ylidene)amino)ethyl)-3-(triethoxysilyl)propane-1-amine (the compound represented by the following formula (1-4)) (1.82 mmol) was added as a terminal modifier, and then reaction was allowed to proceed for 15 minutes. To the resultant modified conjugated diene-based polymer solution was added 2,6-di-tert-butyl-p-cresol (3.52 g). Subsequently, polymer coagulation of the polymer solution (rubber content: 200 g) was performed in methanol (2,000 g), and the solvent was then removed through steam stripping. The resultant product was dried by means of a heating roll whose temperature was adjusted to 110° C., to thereby produce a modified conjugated diene-based polymer i. Various physical properties and the like of the resulting modified conjugated diene-based polymer i are shown in Table 1 below.

[F8]

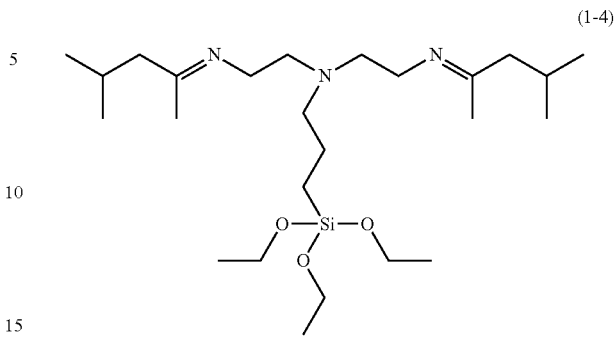

(1-4)

Example 2: Synthesis and Physical Properties of Modified Conjugated Diene-Based Polymer ii A modified conjugated diene-based polymer ii was produced in the same manner as employed in Example 1, except that n-butyllithium (3.87 mmol) serving as a polymerization initiator was replaced with ((2E,6E)-11-(dimethylamino)-3,7-dimethylundeca-2,6-dien-1-yl)lithium (the compound represented by the following formula (2-1)) (3.87 mmol). Various physical properties and the like of the resulting modified conjugated diene-based polymer ii are shown in Table 1 below.

[F9]

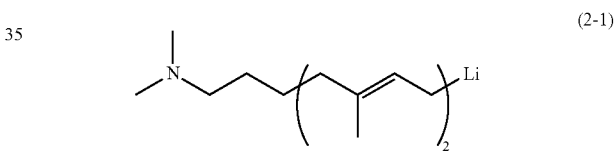

(2-1)

Comparative Example 1: Synthesis and Physical Properties of Conjugated Diene-Based Polymer iii The polymer synthesis was performed in the same manner as employed in Example 1, except that the amount of n-butyllithium serving as a polymerization initiator was changed to 1.94 mmol, the terminal modifier was replaced with octanol (3.63 mmol) serving as a terminator, and reaction was allowed to proceed for 15 minutes, to thereby produce an unmodified conjugated diene-based polymer iii. Various physical properties and the like of the resulting conjugated diene-based polymer iii are shown in Table 1 below.

Comparative Example 2: Synthesis and Physical Properties of Modified Conjugated Diene-Based Polymer iv The polymer synthesis was performed in the same manner as employed in Example 1, except that N,N-bis(2-(((E)-4-methylpentan-2-ylidene)amino)ethyl)-3-(triethoxysilyl)propane-1-amine (1.82 mmol) serving as a terminal modifier was replaced with dimethyldichlorosilane (1.82 mmol), and reaction was allowed to proceed for 15 minutes, to thereby produce a modified conjugated diene-based polymer iv.

Various physical properties and the like of the resulting modified conjugated diene-based polymer iv are shown in Table 1 below.

TABLE 1

|  | Example 1 | Example 2 | Comparative Example 1 | Comparative Example 2 |
|---|---|---|---|---|
| <Polymerization formulation> | | | | |
| Type of initiator | Initiator 1 | Initiator 2 | Initiator 1 | Initiator 1 |
| Type of terminal modifier | Modifier 1 | Modifier 1 | — | Modifier 2 |
| Polymer No. | i | ii | iii | iv |
| <Properties of polymer> | | | | |
| Vinyl content (%) | 57 | 57 | 56 | 57 |
| Bonded styrene content (%) | 28 | 27 | 28 | 28 |
| Peak molecular weight before modification ($\times 10^4$) | 19 | 20 | 42 | 20 |
| Coupling ratio of two or more branches (%) | 74 | 71 | 4 | 83 |
| Mooney viscosity (ML1 + 4, 100° C.) | 51 | 57 | 55 | 53 |

Abbreviations shown in Table 1 have the following meanings.

Initiator 1: n-butyllithium
Initiator 2: ((2E,6E)-11-(dimethylamino)-3,7-dimethyl-undeca-2,6-dien-1-yl)lithium
Modifier 1: N,N-bis(2-(((E)-4-methylpentane-2-ylidene)amino)ethyl)-3-(triethoxysilyl)propane-1-amine
Modifier 2: dimethyldichlorosilane <Production of Rubber Composition and Crosslinked Polymer>

Components (including each of the above-produced (modified) conjugated diene-based polymers i to iv) were mixed according to the formulation shown in Table 2 below, and the resultant mixture was kneaded to thereby produce a rubber composition. The kneading was performed as described below. In a first kneading step, the modified conjugated diene-based polymer (the unmodified conjugated diene-based polymer in Comparative Example 1), butadiene rubber, an extender oil, silica, carbon black, a silane coupling agent, stearic acid, an antioxidant, and zinc oxide were mixed and kneaded by means of Plastomill (inner volume: 250 mL) equipped with a temperature controller under the following conditions: filling rate: 72%, rotation speed: 60 rpm. Subsequently, in a second kneading step, the above-prepared mixture was cooled to room temperature, and then sulfur and a vulcanization accelerator were added and kneaded. The resultant rubber composition was molded and vulcanized by means of a vulcanizing press at 160° C. for a predetermined period of time, to thereby produce a crosslinked rubber (vulcanized rubber). The crosslinked rubber was evaluated for tensile strength and rolling resistance as described below. The results are shown in Table 3 below.

(1) Tensile strength: the crosslinked rubber was used as a sample for analysis, and the 300% modulus (M300) of the crosslinked rubber was determined according to JIS K6251: 2010. A determined value is represented by an index relative to that (taken as 100) of the crosslinked rubber of Comparative Example 1. A larger value indicates a higher tensile strength; i.e., favorable property.

(2) Rolling resistance (70° C. tan δ): the crosslinked rubber was used as a sample for analysis, and the rolling resistance of the crosslinked rubber was determined by means of ARES-RDA (manufactured by TA Instruments) under the following conditions: shear strain 1.0%, angular velocity: 100 radians/second, temperature: 70° C. The rolling resistance was represented by an index relative to that (taken as 100) of the crosslinked rubber of Comparative Example 1. A larger value indicates a smaller energy loss and better rolling resistance (fuel efficiency).

TABLE 2

| Formulation | (phr) |
|---|---|
| (Modified) conjugated diene-based polymer | 70 |
| Butadiene rubber *1 | 30 |
| Extender oil *2 | 37.5 |
| Silica *3 | 70 |
| Carbon black *4 | 5.6 |
| Silane coupling agent *5 | 5.6 |
| Stearic acid | 2 |
| Antioxidant *6 | 1 |
| Zinc oxide | 3 |
| Vulcanization accelerator D *7 | 1.5 |
| Vulcanization accelerator CZ *8 | 1.8 |
| Sulfur | 1.5 |

Trade names of components shown in Table 2 are as follows.
*1: BR01, manufactured by JSR Corporation
*2: JOMO Process NC-140, manufactured by Japan Energy Corporation
*3: ZEOSIL 1165MP, manufactured by Rhodia
*4: DIABLACK N339, manufactured by Mitsubishi Chemical Corporation
*5: Si75, manufactured by Evonik
*6: Ozonone 6C, manufactured by Seiko Chemical Co., Ltd.
*7: Nocceler D, manufactured by Ouchi Shinko Chemical Industrial Co., Ltd.
*8: Nocceler CZ, manufactured by Ouchi Shinko Chemical Industrial Co., Ltd.

TABLE 3

| Properties of rubber composition | Example 1 | Example 2 | Comparative Example 1 | Comparative Example 2 |
|---|---|---|---|---|
| Type of (modified) conjugated diene-based polymer | i | ii | iii | iv |
| Tensile strength 300% modulus (index) | 112 | 121 | 100 | 85 |
| Rolling resistance 70° C. tanδ (index) | 136 | 146 | 100 | 91 |

As is clear from the results shown in Table 3, the rubber composition of Example 1 or 2 exhibits considerably improved 300% modulus (tensile strength) and 70° C. tan δ, as compared with the rubber composition of Comparative Example 1 or 2. Thus, a crosslinked rubber exhibiting favorable rolling resistance (fuel efficiency) and tensile strength was found to be produced from the modified conjugated diene-based polymer prepared by using the compound [A] as a modifier.

The invention claimed is:
1. A method for producing a modified conjugated diene-based polymer, the method comprising:
reacting a conjugated diene-based polymer comprising an active terminal, obtained by polymerizing a monomer comprising a conjugated diene compound in the presence of an alkali metal compound, with a compound of formula (1):

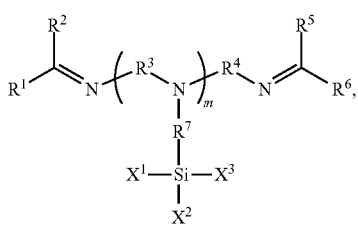

(1)

wherein $R^1$ and $R^2$ are independently a hydrogen atom or a C1 to C8 hydrocarbyl group, or $R^1$ and $R^2$ taken together are a C5 to C8 ring together with the carbon atom to which $R^1$ and $R^2$ bond, $R^1$ and $R^2$ not simultaneously being a hydrogen atom, $R^5$ and $R^6$ are independently a hydrogen atom or a C1 to C8 hydrocarbyl group, or $R^5$ and $R^6$ taken together are a C5 to C8 ring together with the carbon atom to which $R^5$ and $R^6$ bond, $R^5$ and $R^6$ not simultaneously being a hydrogen atom, $R^3$ and $R^4$ are independently a C1 to C6 hydrocarbylene group, $R^7$ is a C1 to C10 hydrocarbylene group, $X^1$ is a C1 to C4 hydrocarbyloxy group, $X^2$ and $X^3$ are independently a C1 to C4 hydrocarbyl group or hydrocarbyloxy group, m is an integer in a range of from 1 to 3, and when m is 2 or 3, a plurality of groups $R^3$, $R^7$, $X^1$, $X^2$, or $X^3$ are identical to or different from one another.

2. The method of claim 1, wherein the alkali metal compound comprises a compound of formula (2):

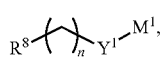

(2)

wherein $R^8$ is a nitrogen-comprising group, $Y^1$ is a hydrocarbylene group prepared by polymerization of a conjugated diene compound or an aromatic vinyl compound, $M^1$ is an alkali metal, and n is an integer in a range of from 1 to 10.

3. The method of claim 2, wherein the compound of formula (2) in the alkali metal compound is present in an amount of 50 mol % or more.

4. The method of claim 2, wherein the alkali metal compound comprises, as the compound of formula (2), ((2E,6E)-11-(dimethylamino)-3,7-dimethylundeca-2,6-dien-1-yl)lithium.

5. The method of claim 1, wherein the monomer further comprises an aromatic vinyl compound.

6. A modified conjugated diene-based polymer, which is a reaction product between a conjugated diene-based polymer comprising an active terminal and a compound of formula (1):

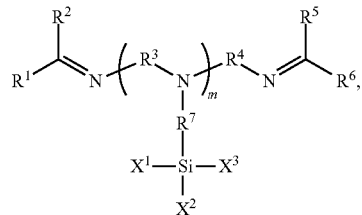

(1)

wherein $R^1$ and $R^2$ are independently a hydrogen atom or a C1 to C8 hydrocarbyl group, or $R^1$ and $R^2$ taken together are a C5 to C8 ring together with the carbon atom to which $R^1$ and $R^2$ bond, $R^1$ and $R^2$ not simultaneously being a hydrogen atom, $R^5$ and $R^6$ are independently a hydrogen atom or a C1 to C8 hydrocarbyl group, or $R^5$ and $R^6$ taken together are a C5 to C8 ring together with the carbon atom to which $R^5$ and $R^6$ bond, $R^5$ and $R^6$ not simultaneously being a hydrogen atom, $R^3$ and $R^4$ are independently a C1 to C6 hydrocarbylene group, $R^7$ is a C1 to C10 hydrocarbylene group, $X^1$ is a C1 to C4 hydrocarbyloxy group, $X^2$ and $X^3$ are independently a C1 to C4 hydrocarbyl group or hydrocarbyloxy group, m is an integer in a range of from 1 to 3, and when m is 2 or 3, a plurality of groups $R^3$, $R^7$, $X^1$, $X^2$, or $X^3$ are identical to or different from one another.

7. A modified conjugated diene-based polymer of formula (3):

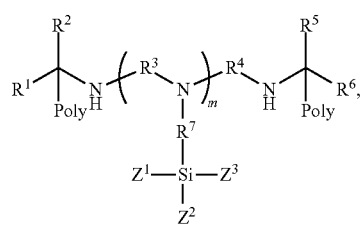

(3)

wherein $R^1$ and $R^2$ are independently a hydrogen atom or a C1 to C8 hydrocarbyl group, or $R^1$ and $R^2$ taken together are a C5 to C8 ring together with the carbon atom to which $R^1$ and $R^2$ bond, $R^1$ and $R^2$ not simultaneously being a hydrogen atom, $R^5$ and $R^6$ are independently a hydrogen atom or a C1 to C8 hydrocarbyl group, or $R^5$ and $R^6$ taken together are a C5 to C8 ring together with the carbon atom to which $R^5$ and $R^6$ bond, $R^5$ and $R^6$ not simultaneously being a hydrogen atom, $R^3$ and $R^4$ are independently a C1 to C6 hydrocarbylene group, $R^7$ is a C1 to C10 hydrocarbylene group, Poly is an optionally modified conjugated diene-based polymer chain, $Z^1$ is a C1 to C4 hydrocarbyloxy group or an optionally modified conjugated diene-based polymer chain, $Z^2$ and $Z^3$ are independently a C1 to C4 hydrocarbyl group, a C1 to C4 hydrocarbyloxy group, or an optionally modified conjugated diene-based polymer chain, m is an integer in a range of from 1 to 3, and when m is 2 or 3, a plurality of groups $R^7$, a plurality of $R^3$, $R^7$, $Z^1$, $Z^2$, or $Z^3$ are identical to or different from one another.

8. A polymer composition, comprising:
the modified conjugated diene-based polymer of claim 6;
silica; and
a crosslinking agent.

9. A crosslinked product, produced by crosslinking the polymer composition of claim 8.

10. A tire, comprising:
a tread; and
a sidewall,
wherein the tread and/or the sidewall comprises the polymer composition of claim 8.

* * * * *